Figure 1:
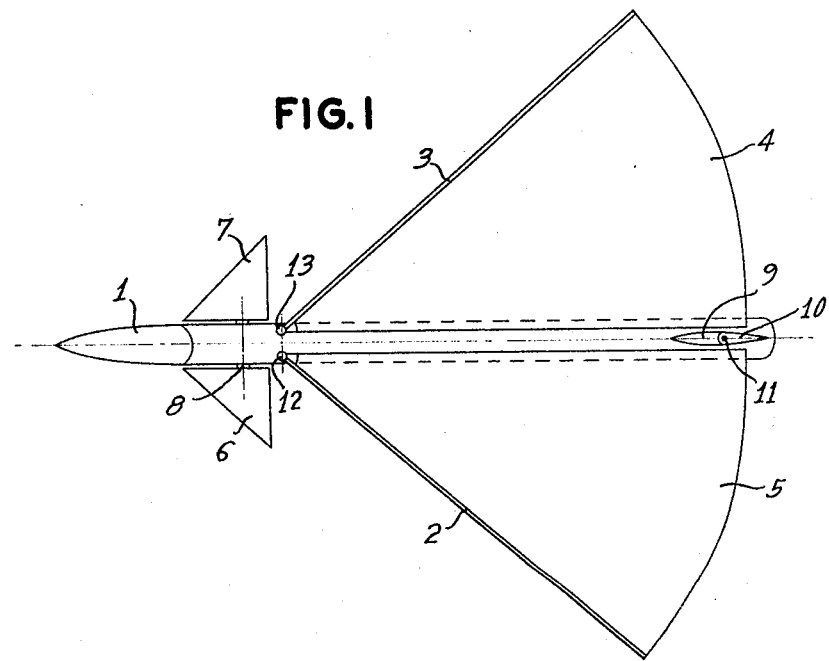

Oct. 18, 1966   E. WIELAND ET AL   3,279,723
AIRCRAFT HAVING FLEXIBLE WING SURFACES
Filed June 30, 1964   3 Sheets-Sheet 1

INVENTORS
Ernst Wieland
Wilfried Sackmann
BY Alfons Friedel
Erich Kuhn
Günther Harms
ATTORNEY Oct. 18, 1966  E. WIELAND ET AL  3,279,723
AIRCRAFT HAVING FLEXIBLE WING SURFACES
Filed June 30, 1964  3 Sheets-Sheet 2
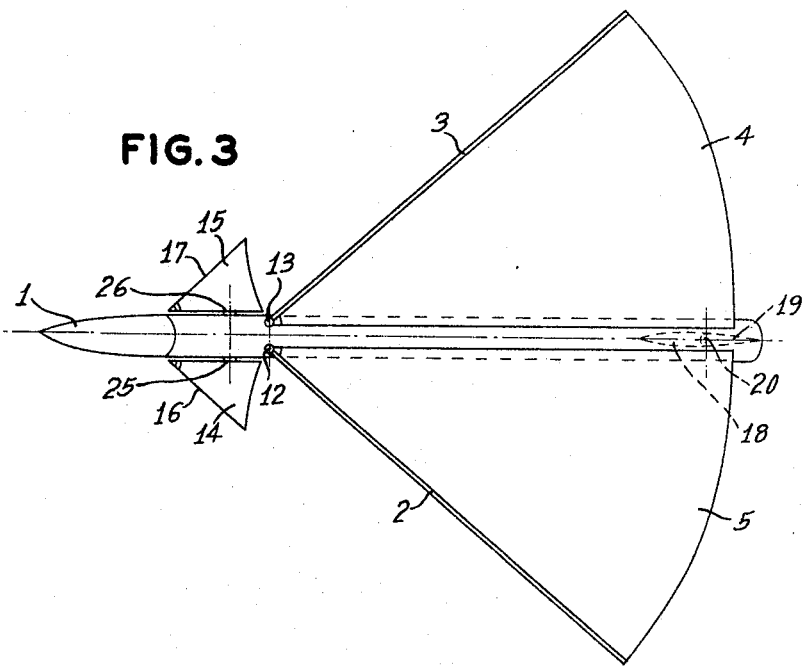
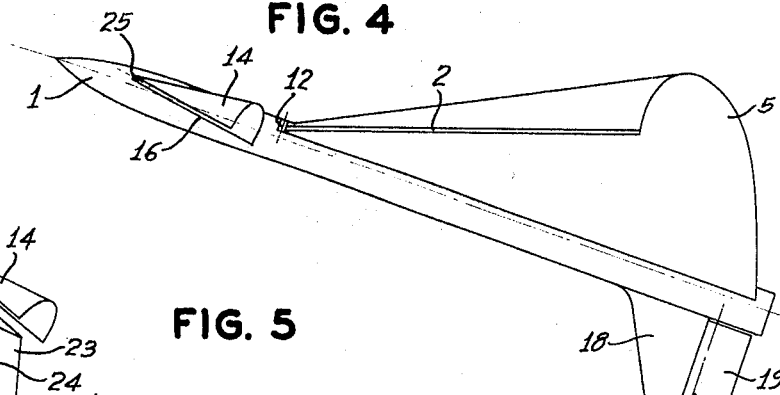
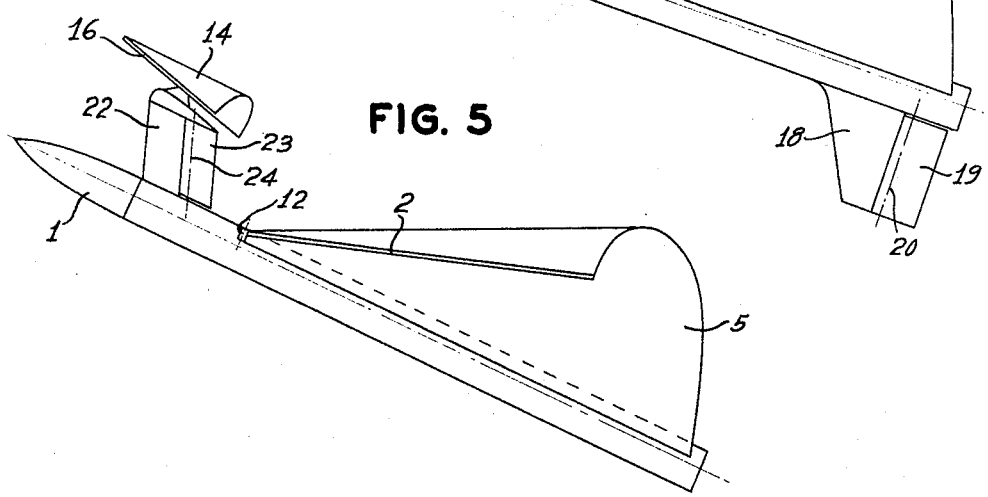
INVENTORS
Ernst Wieland
Wilfried Sackmann
BY Alfons Friedel
Erich Kuhn
Günther Harms
ATTORNEY

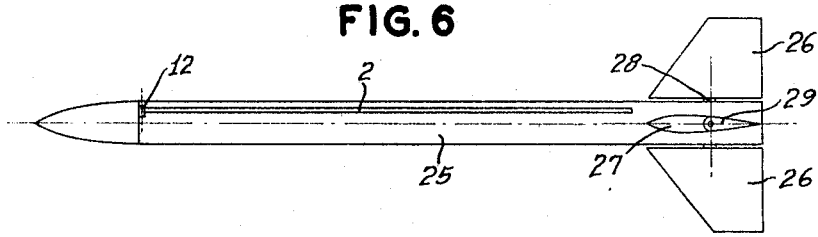
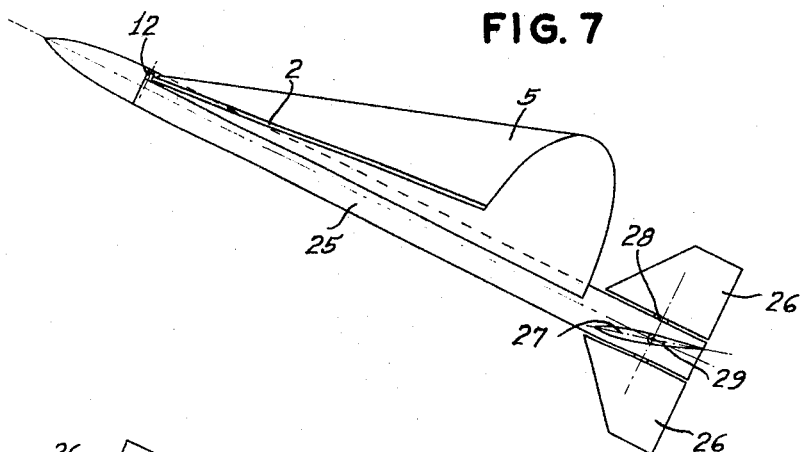
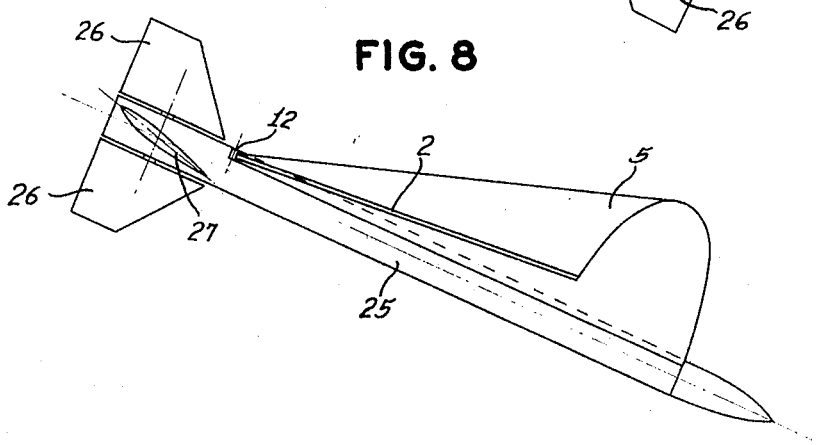

Patented Oct. 18, 1966

3,279,723
AIRCRAFT HAVING FLEXIBLE WING SURFACES
Ernst Wieland, Langenargen, Wilfried Sackmann, Immenstaad, Alfons Friedel, Neukirch, Erich Kuhn, Langenargen, and Günther Harms, Friedrichshafen-Manzell, Germany, assignors to Dornier System G.m.b.H., Friedrichshafen, Germany, a limited-liability corporation of Germany
Filed June 30, 1964, Ser. No. 379,400
Claims priority, application Germany, July 5, 1963, D 41,910
3 Claims. (Cl. 244—75)

This invention relates to an aircraft of the type known as a "paraglider" or "flex-wing." The supporting surfaces or wings of such aircraft consist of a central longitudinal keel which extends in the direction of flight and two leading edges which diverge from the front of the aircraft towards the rear thereof, a flexible covering being secured between the keel and the two leading edges. A nacelle or fuselage is mounted some distance below the flexible wings in order to assure a high inherent stability of the entire aircraft as the result of a low center of gravity. It has been previously proposed to fabricate the keel as a nacelle and to arrange flexible wings or airfoils at the sides of the nacelle in a manner such that they can be extended and retracted.

One of the problems in the operation of paragliders is the steering, or control, and stabilization thereof. One means known to the art, and which is most frequently employed, for the control of paragliders is the displacement of the center of gravity thereof with respect to its pressure point or aerodynamic center. Displacement of the center of gravity towards the front or rear of the aircraft results in a change of the angle of incidence whereas a displacement to either side results in a change in the direction of flight. This type of control is, however, very slow in response since relatively large forces must be employed for shifting the center of gravity. In one embodiment of a paraglider in which the nacelle is mounted below the wings an additional side rudder was secured to the rear of the fuselage behind a propeller, the propeller serving to provide the forward thrust. This type of construction improves the steering or control of the aircraft but even with this complementary device, steering or control remains imperfect since it is feasible only if the distance between the center of gravity and the aerodynamic pressure point or center assumes significant positive values in the Z-axis. In paragliders in which the keel also constitutes the nacelle of the aircraft, the center of gravity is positioned very closely to the aerodynamic pressure point or center and control by means of shifting the center of gravity is practically impossible.

In another known method of steering such an aircraft, for the purpose of performing in-flight maneuvers, the angle between the keel and the leading edges may be varied by means of the leading edges being pivotably mounted on the keel. A variation in one or both of the angles between the leading edges and the keel results in a change of flight direction. The angular displacement is obtained by shortening or extending supporting or suspending wires between the wings and the fuselage. During this operation, a pressure point displacement, which is extremely difficult to avoid and which causes an undesirable imbalance in the control, is produced simultaneously with the angular displacement.

In order to prevent the aforementioned imbalance in steering, insofar as is possible, it has been proposed to effect steering or control by displacing the central keel member whereby the angle between the leading edges remains constant. In this arrangement, no significant displacement of the aerodynamic pressure point or center results.

To improve the altitude control of paraglider aircraft, it has also been proposed to mount a horizontal tail assembly in the slip stream of a pulling propeller. This horizontal tail assembly influences the propeller slip stream in a manner such that it impinges from below upon the rearward portion of the wing surface and thus effects there an additional moment about the transverse axis.

The stabilization of manned and unmanned paraglider aircraft has been heretofore achieved by the use of a low center of gravity. This method of stabilization is, however, feasible only in aircraft of limited maneuverability and low flying speeds. It results in high static stability while neglecting the dynamic stability.

The present invention improves the control and stability of paragliders, i.e., aircraft having flexible wings, by employing aerodynamic control and/or stabilizing surfaces which are disposed on the central longitudinal keel of the aircraft. These control and/or stabilizing surfaces may be arranged forward of and/or to the rear of the aerodynamic pressure point or center. The method of control and stabilization of the present invention may be specifically employed in aircraft having flexible wing surfaces and which have a high center of gravity, but the use of the present invention in paraglider aircrat having a low center of gravity is also possible. The aerodynamic control and stabilizing surfaces can be used in both instances and may also be utilized for trimming purposes in a conventional known manner.

Figure 2:
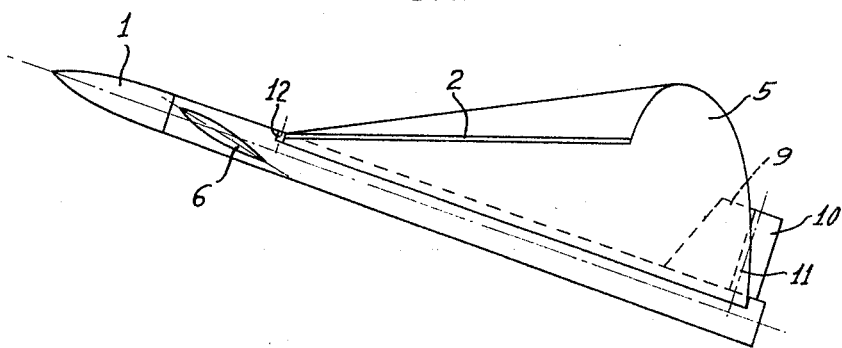

The invention will be further illustrated by reference to the accompanying drawings in which:

FIGURE 1 is a plan view of a paraglider aircraft provided with a canard and vertical stabilizer and rudder assembly. The canard is of a type having rigid surfaces for elevation or altitude control, FIGURE 2 is a side view of the paraglider shown in FIGURE 1, FIGURE 3 is a plan view of a paraglider having a canard with flexible supporting surfaces mounted thereon. This embodiment also includes a stabilizer and rudder assembly mounted below the central longitudinal keel, FIGURE 4 is a side view of the paraglider of FIGURE 3, FIGURE 5 is a side view of a paraglider having a canard forwardly mounted on a vertical stabilizer and rudder assembly.

FIGURE 6 is a plan view of an aircraft having flexible supporting surfaces which are adapted to be extended and retracted, the supporting surfaces being shown in the retracted position, FIGURE 7 is a side view of the aircraft of FIGURE 6 with the supporting surfaces in the extended position, and FIGURE 8 is another embodiment of an aircraft with extended flexible supporting surfaces.

In the drawings, identical elements in the various figures are designated with the same reference numerals. In the embodiments of FIGURES 1 and 2, the central longitudinal keel 1 is formed by the aircraft itself. The leading edges of the wings are connected to the keel in a conventional manner as shown at 12 and 13 but at some distance from the tip of the keel. A flexible covering 4 and 5 is secured between the keel 1 and the leading edges 2 and 3, respectively. The flexible wing surfaces may be retracted into the central keel member and extended therefrom. A canard having the surfaces 6 and 7 is mounted on the extended tip of the keel member 1 and may consist, as is conventional, of rigid unitary surfaces which are pivotable about the axis 8. It is also possible, however, for the canard to consist of fixed horizontal stabilizers having pivotable elevators mounted thereon. The assembly mounted at the rear end of the keel 1 is composed of a vertical stabilizer 9, which is rigidly attached to the keel, and a rudder 10 which is pivotably secured to the vertical stabilizer and pivots about the axis 11.

In the embodiments of FIGURES 3 and 4, the canard assembly has the flexible surfaces 14 and 15. These surfaces have a form similar to that of the main paraglider supporting surfaces and are secured to the leading edges 16 and 17, respectively. The leading edges 16 and 17 may be pivotably mounted as shown at 30 and 31 and, together with the flexible surfaces 14 and 15, may be retracted into or extended from the keel 1. Such a retractable and extendable mounting of the canard assembly is advantageous when the aircraft is used in the recovery of rockets and the like. The canard assembly having the flexible surfaces may be retracted into and extended from the keel in a manner similar to that of the main flexible aircraft supporting surfaces. The flexible surfaces of the canard assembly may also assume the form of a flat delta wing upon a further spreading of the leading edges and thereby the aerodynamic resistance thereof is reduced to a minimum. Also, the control which is conventional in paraglider aircraft may be transmitted to a canard assembly of this type by pivoting the leading edges. An assembly is mounted at the rear end of the keel 1 and consists of the rigid vertical stabilizer 18 and rudder 19, the latter being pivotably connected to the stabilizer and being pivotable about the axis 20. This assembly provides for control and stabilization of the aircraft about the vertical axis thereof.

The embodiment of FIGURE 5 shows a particularly advantageous arrangement of the control and stabilizing surfaces mounted on the central longitudinal keel of the paraglider. The stabilizer and rudder assembly in this embodiment is mounted forward of the neutral point of the aircraft and the fin 22 serves simultaneously as a vertical stabilizer and as a mounting for the canard mounted on the top thereof, in an elevated position with respect to the keel 1. This construction results in a non-rotational or vortex-free air flow about the control and stabilizing surfaces, which is particularly favorable from the standpoint of flow techniques, while simultaneously assuring that no disturbances in the flow or circulation of the air over the flexible main supporting surfaces of the aircraft will be produced. In this embodiment, the canard assembly has flexible wings which may be replaced in other embodiments by rigid wings, if desired. However, the use of flexible or rigid wings is not critical. The rudder 23 is connected to the vertical stabilizer 22 and pivots about the axis 24.

One important use of paragliders is in the recovery and return of rockets, space ships, and the like. The assembly to be recovered is guided to a predetermined landing position with the aid of a paraglider. A paraglider having control and stabilizing surfaces constructed in accordance with the present invention may be used very advantageously in such cases independently of whether the supporting surfaces are mounted relatively far above the aircraft to be recovered or whether they are secured directly thereto so that the aircraft simultaneously forms the longitudinal keel member. In both cases, the steering, or control, and the stabilization will be improved by the surfaces mounted and provided in accordance with the present invention.

FIGURE 6 shows an embodiment of the invention in which a rocket 25 is equipped with extendable flexible airfoil surfaces which are used in the recovery operation. The flexible supporting surfaces are accommodated lengthwise in the rocket body and are covered by the leading edges 2, the latter being so mounted and constructed with respect to the external covering or skin of the rocket that they form a component thereof in the retracted position and do not produce an additional aerodynamic resistance. They may simultaneously serve as a heat shield for the flexible covering positioned in the rocket body and, thus, replace the heretofore used covering means.

FIGURE 7 shows the aircraft of FIGURE 6 during the return or recovery phase with the flexible supporting surfaces in the extended position, these surfaces being mounted forward of the control and stabilizing surfaces 26 and 27, in the direction of flight. The aerodynamic stabilizing fins 26 and 27 utilized in the ascending phase of the rocket flight are not rigidly connected with the rocket 25 in the conventional manner but are, instead, mounted to pivot about the axes 28 and 29, respectively, so they may be employed as rudder surfaces during the return or recovery phase of the flight. During the ascending phase of the flight, the fins are locked in position with respect to the body of the rocket 25 whereas they are released for purposes of steering and control in the return or recovery phase of the flight. This release occurs, in most instances, simultaneously with the extension of the paraglider wings. The stabilizing surfaces 27, which serve as horizontal stabilizers during the recovery or return phase of the flight, will automatically assume a predetermined angle of incidence after release, which angle is coordinated with respect to the flight characteristics of the aircraft. This specific angle of incidence of the stabilizing surfaces is necessary so that the aircraft will assume the position most favorable for flight. The position of the horizontal tail unit or assembly 27, shown in FIGURE 7, is, thus, the zero position thereof.

The present invention may also be utilized in various modifications thereof. It is not necessary that the tail planes shown in the embodiment of FIGURES 6 and 7 be mounted on the rear of the aircraft but, instead, such planes may be mounted on the forward portion thereof, as shown in the embodiment of FIGURE 8. In this case, the control and stabilizing surfaces 26 and 27 are positioned forwardly of the extended flexible supporting surfaces, in contrast to the embodiment of FIGURES 6 and 7.

It will be obvious to those skilled in the art that many modifications may be made within the scope of the present invention without departing from the spirit thereof, and the invention includes all such modifications.

What is claimed is:

1. An aircraft comprising a keel having a Rogallo-type wing mounted thereon and at least one canard having flexible wing surfaces mounted on the keel.

2. An aircraft according to claim 1 in which each flexible wing surface of the canard is secured to a keel and to a leading edge, and including means for varying the angle between the keel and the leading edge.

3. An aircraft according to claim 1 in which the canard is mounted on a vertical stabilizer and rudder assembly, the latter being secured to the keel of the aircraft.

References Cited by the Examiner
UNITED STATES PATENTS

| | | | |
|---|---|---|---|
| 983,243 | 1/1911 | Lamburth | 244—75 |
| 983,868 | 2/1911 | Bellville | 244—75 |
| 1,202,429 | 10/1916 | Reily | 244—75 |
| 3,135,483 | 6/1964 | Girard | 244—75 |
| 3,153,877 | 10/1964 | Effinger et al. | 46—78 |
| 3,185,412 | 5/1965 | Rogallo. | |

MILTON BUCHLER, *Primary Examiner.*

ANDREW H. FARRELL, FERGUS S. MIDDLETON,
*Examiners.*